Patented June 3, 1924.

1,496,085

UNITED STATES PATENT OFFICE.

KAROL DZIEWOŃSKI, OF CRACOW, POLAND.

PROCESS FOR THE PREPARATION OF DYESTUFFS CONSISTING IN TREATING DECACYCLENE WITH SULPHURIC ACID.

No Drawing. Original application filed March 3, 1921, Serial No. 449,590. Divided and this application filed December 1, 1921. Serial No. 519,103.

*To all whom it may concern:*

Be it known that I, KAROL DZIEWOŃSKI, a citizen of the Polish Republic, and resident of Cracow, Poland, have invented certain new and useful Improvements in Processes for the Preparation of Dyestuffs Consisting in Treating Decacyclene with Sulphuric Acid, of which the following is a specification.

It is known from the investigations of K. Dziewoński and others, that by the action of sulphur on acenaphthenes or its derivatives strongly coloured compounds are formed, for instance the bronze-yellow decacyclene $C_{36}H_{18}$.

I have found that the decacyclene is easily converted into dyestuffs by treating the same with ordinary or fuming sulphuric acid.

The following example will serve as an illustration of the invention, but the invention is not confined to this concrete example.

Example.

10 parts of decacyclene are treated with 60 parts of sulphuric acid, to which 5 grammes of 20% fuming sulphuric acid have been added for 6 to 7 hours in the cold or some shorter time at a higher temperature. The sulphonation takes place accompanied by oxidation and liberation of sulphur dioxide, the product obtained being perfectly soluble in water. My investigations showed, that the product is most likely a trioxydecacyclene-trisulphonic acid, forming barium and calcium salts difficultly soluble in water, whereas the sodium salt is easily soluble. The latter is precipitated in the form of a colloidal voluminous mass by the addition of sodium chloride to the acid. It forms a very fast and uniform yellow or bronze yellow dyestuff dyeing wool and silk in an acid bath. As a free acid it exhibits strongly colloidal properties; it is easily soluble in hot water, on cooling the solutions gelatinize to a homogenous semi-solid mass.

What I claim is:—

1. A process for the preparation of dyestuffs, consisting in treating decacyclene with sulphuric acid.

2. A process for the preparation of dyestuffs, consisting in treating 10 parts of decacyclene with 60 parts sulphuric acid, to which 5 grammes of 20% fuming sulphuric acid have been added during 6 to 7 hours, dissolving the product obtained in water and adding sodium chloride to the solution to obtain the precipitated sodium salt.

In testimony that I claim the foregoing as my invention, I have signed my name in presence of two subscribing witnesses.

KAROL DZIEWOŃSKI.

Witnesses:
ALEXANDER TYSUKONSON,
ARTHUR SZEUVERT.